Jan. 30, 1962     A. R. ANDERSSON ET AL     3,019,286
INSULATED ELECTRICAL CONDUCTORS AND PROCESS FOR PRODUCING SAME
Filed June 9, 1959
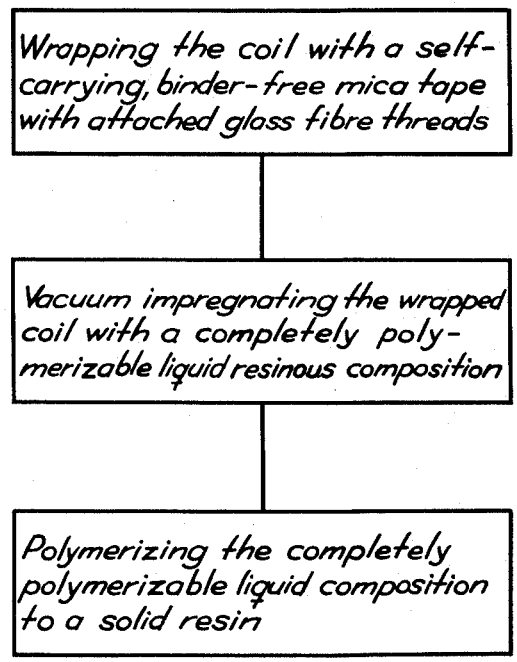
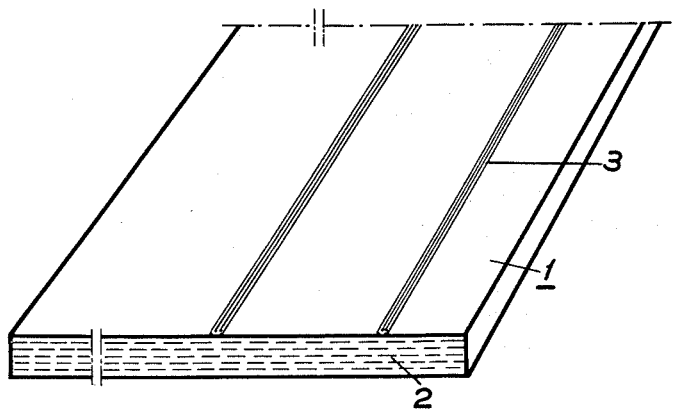
INVENTORS.
Anders Ragnar Andersson
and   Per Torsten Ågren
BY
Attorney.

Jan. 30, 1962  A. R. ANDERSSON ET AL  3,019,286
INSULATED ELECTRICAL CONDUCTORS AND PROCESS FOR PRODUCING SAME
Filed June 9, 1959  2 Sheets-Sheet 2
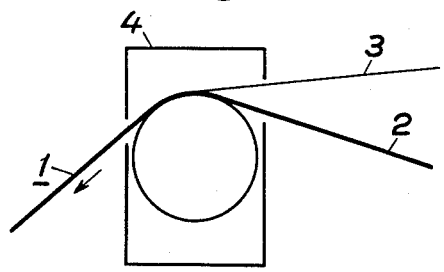
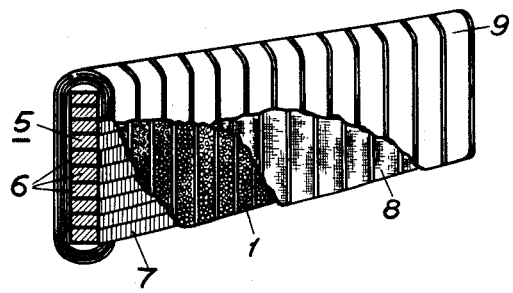
INVENTORS.
Anders Ragnar Andersson
and Per Torsten Ägren
BY
Attorney.

United States Patent Office 3,019,286
Patented Jan. 30, 1962

3,019,286
INSULATED ELECTRICAL CONDUCTORS AND
PROCESS FOR PRODUCING SAME
Anders Ragnar Andersson and Per Torsten Ågren, Vasteras, Sweden, assignors to Allmanna Svenska Elektriska Aktiebolaget, Vasteras, Sweden, a corporation of Sweden
Filed June 9, 1959, Ser. No. 819,094
Claims priority, application Sweden June 19, 1958
8 Claims. (Cl. 174—121)

This invention relates to a process for producing insulated electrical high voltage conductors, windings, coils and the like.

Coils for high voltage machines are usually insulated with mica tape, which is wrapped around the conductor or the bundle of conductors of the coil in several layers. Often, tapes are used consisting of mica flakes which are attached to a tape-shaped backing or base such as paper, silk or glass cloth. After the tape insulation has been applied on the conductor or the bundle of conductors it is impregnated usually under vacuum, with an impregnating material, which consists, e.g. of asphalt, or of a completely polymerizable liquid resinous composition. The impregnation is made in order to fill the voids and air spaces occurring in the insulation as completely as possible so that the insulation is given good electric and mechanical properties. Incomplete filling leads to internal discharges in the remaining voids of the insulation which, as a consequence of the damaging action of the discharges, limits the use of the insulation to voltages lower than the insulation would withstand if no voids existed.

It has been proved by impregnating insulations built up in the mentioned way that the binder in the mica tape renders the penetration of the impregnating material difficult and that the filling of the voids is consequently incomplete. In order to improve the impregnating properties, it has earlier been suggested to use a volatile binder in the tapes which, after the tapes have been wrapped around the conductors is volatilized before the insulation is impregnated, or to use in the tape a binder which is soluble in the impregnant. The use of a volatile binder, however, leads to the manufacture of the insulation being complicated and expensive because of the process required for the removal of the binder as well as the special steps which have to be taken when storing the tapes because of the volatility of the binder. The use of a binder soluble in the impregnant has the disadvantage that the impregnating process is very tedious, as the impregnant cannot penetrate faster than it can dissolve the binder.

In an insulation built up of several consecutive layers of a material consisting of mica flakes attached to a backing, each layer of mica flakes is separated from the adjacent layer of mica flakes by a layer of the backing. For materials hitherto used as backings the relative permittivity as well as the dielectric strength is considerably lower than for mica. This leads to the fact that the greater proportion of an applied electric strength will appear across the electrically weakest component of the insulation and so the build-up of the insulation in different layers makes it impossible to make full use of the excellent dielectric strength of the mica.

It is an object of this invention to provide a process for producing insulated conductors and coils embodying mica and thermoset resins combined to produce an insulation having outstanding properties. Another object of the invention is to provide a process for producing insulated conductors and coils having, within the insulation, a favourable distribution of the relative permittivity and the dielectric strength. A still further object of the invention is to provide electrical conductors and coils with solid voidless insulation comprising mica and a thermoset resin. Another object of the invention is to provide a process for rapidly and economically impregnating mica tape insulation applied to a conductor with a completely reactive polymerizable composition. Other objects of the invention will appear hereinafter. For a better understanding of the nature and objects of the invention, reference should be made to the following detailed description and drawings, in which:

FIGURE 1 is a schematic diagram of the process of this invention;

FIGURE 2 is a fragmentary perspective view of an insulating tape for wrapping around a conductor or a coil;

FIGURE 3 is a cross-sectional view in elevation illustrating the manufacturing of an insulating tape, and FIGURE 4 is a fragmentary perspective view of a coil insulated according to the invention.

The invention relates to a process for producing insulated high voltage conductors and coils comprising wrapping a conductor or a bundle of conductors with an insulating tape consisting of a self-carrying, binder-free tape built up of small mica flakes overlapping each other, and of glass fibre threads which are attached to the mica tape parallel to the longitudinal direction of the tape and which cover only a small part of the surface of the mica tape, vacuum impregnating the wrapped conductor or bundle of conductors with a completely polymerizable, liquid, resinous composition and polymerizing the completely polymerizable composition to a solid resin. The thickness of the glass fibre threads is chosen so that it is preferably smaller than the thickness of the mica tape. The threads are placed at such a distance from each other that they cover preferably one tenth to one hundredth of the surface of the mica tape.

The mentioned self-carrying, binder-free tape produces a tape of small mica flakes, which can be manufactured in a well-known way described in the U.S. Patent No. 2,549,880 and comprising splitting common mica by first heating it and then subjecting it successively to the action of two solutions capable of reacting upon each other so as to produce a disengagement of gas, thereafter placing the split mica in water to form a pulp of mica flakes, which is subjected to a further treatment according to a method similar to that used in the manufacture of paper. The mica tape which is self-carrying, consists of incidentally arranged small mica flakes, overlapping each other and being bonded to each other by molecular forces acting between them. The task of the glass fibre threads is to increase the tensile strength of the insulating tape in the longitudinal direction. The glass fibre threads have a higher modulus of elasticity than the mica tape and therefore the glass fibre threads absorb tensile stresses occurring while the mica tape is almost entirely unloaded. As binder to attach the glass fibre threads to the mica tape, thermoplastic fibres, for example, can be used. The last-mentioned fibres can be applied parallel to the glass fibres of the thread and are heated to the melting temperature of the thermoplastic in order to effect attachment.

Referring to FIGURE 1 of the drawing, there is a schematic illustration of the steps of the process according to the invention.

The following are special examples of processes for producing insulations described in connection with FIGURES 2, 3 and 4.

*Example 1*

The binder-free, self-carrying mica tape 2 of the insulating tape 1 has a thickness of 0.09 mm. and a width of 25 mm. On one side of the mica tape, parallel to its longitudinal direction 9 glass fibre threads 3 are attached at equal distances from each other of about 2.5 mm. Each glass fibre thread consists of 204 glass fibres with a diameter of about 5μ. As a binder to attach the glass fibre threads to the mica tape, for each glass fibre thread is used a 50 denier thermoplastic fibre thread consisting of 24 fibres of polyethylene glycol terephthalate polymer which, before the glass fibre thread is attached to the mica tape, is applied to the surface of the glass fibre thread by twisting together the glass fibre thread and the thermoplastic thread. The glass fibre thread is attached to the mica tape as clearly seen from FIGURE 3. The mica tape 2 and the threads 3 of glass fibres with applied thermoplastic fibres pass through a heating means 4, where they for some seconds are subjected to a temperature of about 300° C., so that the thermoplastic fibres melt. The melted thermoplastic flows around at least some of the glass fibres simultaneously as it wets the surface of the mica tape. When the insulating tape 1, after the passage of the heating means, is cooled the thermoplastic passes into a solid state at about 200° C. and the glass fibre threads are then fixed and attached to the surface of the mica tape through the adherence of the thermoplastic.

The insulating tape 1 is then used for insulating the coil 5 shown in FIGURE 4. The coil is in this case composed of a plurality of individual conductors 6 which have been moulded in a hot press and formed into a bonded coil. The number of individual conductors may be 25 and the cross section of each conductor 2.5 x 10 mm. Each conductor has before the moulding been provided with an insulation consisting of a covering 7 of glass fibres and of an epoxy resin, e.g. "Araldit 15" with "Curing agent 15" from Ciba A.G., Switzerland, the proportion by weight of the ingredients of the resin being 100:30. The coil formed in this way is wrapped with 12 layers of the insulating tape 1 described earlier in Example 1, with half overlap, and finally with a 0.13 mm. thick and 30 mm. wide glass fibre tape 8 without overlap acting as a protective tape for the mica tape. The wrapped coil is placed in an impregnating tank, where moisture and other volatile substances are first removed at a pressure of about 0.1 mm. Hg and at a temperature of about 40° C. for about 2 hours. An impregnating resin consisting of 85 parts by weight of the epoxy resin "Araldit F," 100 parts of "Curing agent 905," both from Ciba A.G., Switzerland, and 15 parts of phenyl glycidyl ether is then introduced into the impregnating tank at the mentioned pressure, so that the coil is totally immersed in the resin. Thereafter a pressure of 25 kp./cm.$^2$ is applied with nitrogen gas for 4 hours. The temperature for impregnation is held at 40° C. The coil is then withdrawn from the impregnant and wrapped with 30 mm. wide and 0.05 mm. thick film tape 9 of polyethylene glycol terephthalate polymer with half overlap. The task of this tape, which is practically impervious to the impregnant, is to prevent the impregnant leaving the insulation before curing and to act as release agent during the forming of the insulation which takes place in a mould at a temperature of about 160° C. and at a pressure of 3 kp./cm.$^2$ during a time of 4 to 6 hours. By this treatment the liquid resin is cured and transferred into a solid resin. After the curing of the resin the impervious tape is removed from the coil. In FIGURE 4 the different layers of tapes wrapped around the coil are partly removed in order that the different material applied will be visible.

Example 2

On one side of a binder-free self-carrying mica tape 2 with a thickness of 0.065 mm. and a width of 25 mm., 12 glass fibre threads 3 are applied parallel to the longitudinal direction of the mica tape at equal distances from each other of about 2 mm. Each glass fibre thread consists of 102 glass fibres with a diameter of about 5μ. To attach the glass fibre threads to the mica tape a chloroprene polymer "Pliobond 20" from Goodyear Tyre Rubber Co. is used. The glass fibre threads are thereby first coated with this polymer by using a methyl ethyl ketone solution containing 20 percent by weight of the polymer. The coated glass fibre thread is dried and then applied to the mica tape in the way described in Example 1, the temperature of the heating means 4, however, being about 200° C.

The insulating tape so obtained is then used for insulating a coil. The coil, as before, is composed of a plurality of individual conductors each provided with insulation. The insulated conductors have been moulded in a hot press and formed into a bonded coil. The number of individual conductors is 20 and the cross section of each conductor 2.5 x 10 mm. The insulation of each conductor consists of a glass fibre covering and of a polyester resin of the same type as is used as impregnant for the insulation of the coil and described later. The coil is wrapped with 16 layers of the insulating tape with half overlap and finally with a layer of glass fibre tape as in Example 1. The wrapped coil is subjected to resin impregnating process wherein the coil is first evacuated to remove all air and moisture therefrom and then an unsaturated polyester resin is applied to the evacuated coil to ensure complete impregnation. The coil is immersed in the resin at the pressure used at evacuating, 0.1 mm. Hg, and then a pressure of 25 kp./cm.$^2$ is applied. The temperature at impregnation is held at 40° C. and the time for the pressure-period is one hour. The polyester resin used for the impregnation is manufactured in the following way. Maleic anhydride, phthalic anhydride and propylene glycol in the proportion 2 moles of maleic anhydride, 1 mole of phthalic anhydride and 3.3 moles of propylene glycol are reacted in inert atmosphere under successive raising of the reaction temperatutre to 220° C., after which the temperature is maintained at this level until the acid number of the reaction product is 30. To the reaction product is then added diallyl phthalate in such an amount that the product so obtained contains 30 percent by weight of diallyl phthalate. Further, 1 percent by weight of benzoyl peroxide is added as a catalyst. After the coil has been withdrawn from the impregnant it is wrapped with the same impervious tape and in the same way as described in Example 1. Thereafter the insulation is formed in a mould at a temperature of about 130° C. and at a pressure of 3 kp./cm.$^2$ during a time of one hour. The impregnant is thereby cured and transferred into a solid resin. After the curing of the resin the impervious tape is removed from the coil.

Example 3

On one side of a binder-free, self-carrying mica tape 2 with a thickness of 0.09 mm. and a width of 25 mm. 17 glass fibre threads 3 are applied parallel to the longitudinal direction of the mica tape at equal distances from each other of about 1.5 mm. Each glass fibre thread consists of 102 glass fibres with a diameter of about 9μ. The glass fibre threads are attached to the mica tape by using a solution consisting of cresol containing 5 percent by weight of polyamide Ultramid 1C from Badische Anilin und Soda Fabrik, Germany. The glass fibre threads are first treated with this solution and dried before the threads, which then contain the polymer, are applied to the mica tape in the way described in Example 1, the temperature of the heating means 4, however, being about 200° C.

The insulating tape so obtained is then used as described earlier for insulating a coil. Each conductor of the coil is provided with an insulation consisting of a glass fibre covering and of the polyester resin described in Example 2. The number of individual conductors is 30 and the cross section of each conductor 2.5 x 10 mm. The coil is wrapped with 12 layers of the insulating tape with half overlap and finally with a layer of glass fibre tape as in Example 1. Air and moisture is removed in an impregnating tank at 10 mm. Hg and 40° C. for 2 hours. An unsaturated polyester resin containing monostyrene is then introduced in the tank at the mentioned pressure so that the coil is totally immersed in the resin. Thereafter a pressure of 25 kp./cm.$^2$ is applied for one hour.

The temperature is held at 40° C. The polyester resin is manufactured from maleic anhydride, sebacic acid and diethylene glycol by using the ingredients in the proportions 1 mole to 1 mole to 2.2 moles. The reaction conditions are the same as mentioned in Example 2 but the reaction is not stopped before the acid number has reached the value 25. To the reaction product is added monostyren in such an amount that the content of monostyren in the product obtained is 35 percent by weight. Benzoyl peroxide is added in an amount corresponding to 1 percent of the impregnant. After the coil has been withdrawn from the impregnant it is as before wrapped with a polyethylene glycol terephthalate polymer tape and the insulation is formed under curing of the liquid resin in a mould in the same conditions as those mentioned in Example 2, after which the impervious tape is removed from the coil.

It is obvious to those skilled in the art that other thermoplastics such as polyacrylonitrile, polyvinylidene chloride etc. in the form of fibres or solutions may also be used for attaching the glass fibre threads to the mica tape as well as solutions of thermosetting resins, e.g. epoxy resins and polyester resins, with which the glass fibre threads are covered before they are attached to the mica tape. It is also obvious that mica tapes of different thicknesses and glass fibre threads of different types may be used. The number of layers of the insulating tape applied to the coil will be dependent on the thickness of the tape or the required dielectric strength and other factors.

It is further obvious that a coil to be insulated need not, as the coil described in Examples 1 to 3, consist of a bundle of individual conductors but may just as well consist of only one conductor. There will be no principal difference between insulating a coil consisting of one conductor and insulating a coil formed of several individual conductors.

Besides the described completely polymerizable impregnants many other commercially available unsaturated polyester resins and epoxy resins may be used, as well as many different binders for the glass fibres covering the individual conductors of a coil. Although many unsaturated polyester resins and epoxy resins suitable for the impregnation of electrical insulations are well-known, some further examples of such resins may be mentioned. So an impregnant consisting of 60 parts by weight of a reaction product of 3 moles of maleic anhydride, 1 mole of adipic acid, 4.4 moles of ethylene glycol, manufactured according to the process described earlier, and with an acid number of 30, and of 40 parts by weight of diallyl phthalate, and containing 0.75 percent of benzoyl peroxide may be used as well as an impregnant consisting of 70 parts by weight of a reaction product of 1 mole of fumaric acid, 1 mole of phthalic acid and 2.2 moles of propylene glycol reacted to an acid number of 25, and of 30 parts by weight of monostyrene, and containing 0.5 percent of benzoyl peroxide. Among suitable epoxy resins may be mentioned a product consisting of 100 parts by weight of Epon 820 from Shell Chemical Co. and of 65 parts by weight hexahydrophthalic anhydride and a product consisting of 100 parts by weight of Dow 331 from Dow Chemical Co. and of 65 parts by weight of tetrahydrophthalic anhydride.

Owing to the fact that the mica tape of the insulating tape is free from binder the impregnating material can penetrate the tape and fill all voids in the insulation very well. The impregnated insulation is, as mentioned in connection with the curing of the impregnating material subjected to pressure. Thereby excessive impregnant is squeezed out of the insulation. The applied pressure also results in the mica tapes in two adjacent layers of the insulation being brought into immediate contact with each other over practically the whole surface. It has proved possible to reach this result owing to the fact that the glass fibre threads are applied in such a way on the mica tape that they cover only a small part of the surface of the tape, and to the fact that the mica tape while the impregnant is in the liquid state, is soft and somewhat plastic so that the glass fibre threads are pressed into the mica tape when the pressure is applied. The finished insulation is so practically homogeneous and the mica content which, in earlier manufactured insulations with mica tape has been about 40 to 50 percent, is in an insulation according to this invention, about 75 percent of the total weight of the insulation.

We claim:

1. An insulated high voltage conductor comprising in combination, an electrical conductor; an insulating tape wrapped in at least two immediately superposed layers around the conductor comprising an originally binder-free, self-sustaining tape of small mica flakes overlapping each other, and a backing consisting of glass fibre threads which are attached to the mica tape parellel to the longitudinal direction of the tape and which cover only a small part of the surface of the mica tape and are pressed thereinto; and a solid resin derived from a completely liquid resinous composition applied to the conductor and the wrapping thereon impregnating and bonding the whole into a solid member, the major part of the surface of the mica of one layer contacting the surface of the mica in the adjacent layers.

2. An insulated high voltage conductor comprising, in combination, an electrical conductor; an insulating tape wrapped in at least two immediately superposed layers around the conductor comprising an originally binder-free, self-sustaining tape of small mica flakes overlapping each other, and a backing consisting of glass fibre threads which are attached to the mica tape parallel to the longitudinal direction of the tape and which cover one-tenth to one-hundredth of the surface of the mica tape and are pressed thereinto; and a solid resin derived from a completely liquid resinous composition applied to the conductor and the wrappings thereon impregnating and bonding the whole to a solid member, the major part of the surface of the mica of one layer contacting the surface of the mica in the adjacent layers.

3. An insulated high voltage coil comprising in combination, a bundle of several electrical conductors; an insulating tape wrapped in at least two immediately superposed layers around the bundle of conductors an insulating tape comprising an originally binder-free, self-sustaining tape of small mica flakes overlapping each other, and a backing consisting of glass fibre threads which are attached to the mica tape parallel to the longitudinal direction of the tape and which cover only a small part of the surface of the mica tape and are pressed thereinto; and a solid resin derived from a completely resinous composition applied to the bundle of conductors and the wrappings thereon impregnating and bonding the whole into a solid member, the major part of the surface of the mica of one layer contacting the surface of the mica in the adjacent layers.

4. An insulated high voltage coil comprising in combination, a bundle of several electrical conductors; an insulating tape wrapped in at least two immediately superposed layers around the bundle of conductors comprising an originally binder-free, self-sustaining tape of small mica flakes overlapping each other, and a backing consisting of glass fibre threads, which are attached to the mica tape parallel to the longitudinal direction of the tape and which cover one-tenth to one-hundredth of the surface of the mica tape and are pressed thereinto; and a solid resin derived from a completely liquid resinous composition applied to the bundle of conductors and the wrappings thereon impregnating and bonding the whole to a solid member, the major part of the surface of the mica of one layer contacting the surface of the mica in the adjacent layers.

5. In the process of producing an insulated high voltage electrical conductor, the steps comprising wrapping the conductor with a plurality of immediately superposed layers of an insulating tape consisting of a self-sustaining, binder-free tape built up of small mica flakes overlapping each other, and of glass fibre threads which are attached to the mica tape parallel to the longitudinal direction of the tape and which cover only a small part of the surface of the mica tape, vacuum impregnating the conductor provided with the wrapping of insulating tape with a completely polymerizable liquid resinous composition, and while subjecting the impregnated wrapping to sufficient pressure to press the glass fibre threads into the mica and to produce contact between the major part of the surface of the mica in any layer with the surface of the mica in adjacent layers, polymerizing the completely polymerizable liquid composition to a solid resin.

6. In the process of producing an insulated high voltage conductor, the steps comprising wrapping the conductor with a plurality of immediately superposed layers of an insulating tape consisting of a self-sustainnig binder-free tape built up of small mica flakes overlapping each other, and of glass fibre threads, which are attached to the mica tape parellel to the longitudinal direction of the tape and which cover one-tenth to one-hundredth of the surface of the mica tape, vacuum impregnating the conductor provided with the wrapping of insulating tape with a completely polymerizable liquid resinous composition, and, while subjecting the impregnated wrapping to sufficient pressure to press the glass fibre threads into the mica and to produce contact between the major part of the surface of the mica in any layer with the surface of the mica in adjacent layers, polymerizing the completely polymerizable liquid composition to a solid resin.

7. In the process of producing an insulated high voltage electrical coil, the coil comprising a bundle of several conductors, the steps comprising wrapping the bundle of conductors with a plurality of immediately superposed layers of an insulating tape consisting of a self-sustaining, binder-free tape built up of small mica flakes overlapping each other, and of glass fibre threads which are attached to the mica tape parallel to the longitudinal direction of the tape and which cover only a small part of the surface of the mica tape, vacuum impregnating the bundle of conductors provided with the wrapping of insulating tape with a completely polymerizable liquid resinous composition and, while subjecting the impregnated wrapping to sufficient pressure to press the glass fibre threads into the mica and to produce contact between the major part of the surface of the mica in any layer with the surface of the mica in adjacent layers, polymerizing the completely polymerizable liquid composition to a solid resin.

8. In the process of producing an insulated high voltage electrical coil, the coil comprising a bundle of several conductors, the steps comprising wrapping the bundle of conductors with a plurality of immediately superposed layers of an insulating tape consisting of a self-sustaining, binder-free tape built up of small mica flakes overlapping each other, and of glass fibre threads which are attached to the mica tape parallel to the longitudinal direction of the tape and which cover one-tenth to one-hundredth of the surface of the mica tape, vacuum impregnating the bundle of conductors provided with the wrapping of insulating tape with a completely polymerizable liquid resinous composition and, while subjecting the impregnated wrappings to sufficient pressure to press the glass fibre threads into the mica and to produce contact between the major part of the surface of the mica in any layer with the surface of the mica in adjacent layers, polymerizing the completely polymerizable liquid composition to a solid resin.

References Cited in the file of this patent

UNITED STATES PATENTS

| | | |
|---|---|---|
| 543,964 | Michell | Aug. 6, 1895 |
| 1,211,443 | Heany | Jan. 9, 1917 |
| 2,405,576 | Heyman | Aug. 13, 1946 |
| 2,479,417 | Schulman et al. | Aug. 16, 1949 |
| 2,549,880 | Bordet | Apr. 24, 1951 |
| 2,763,315 | Berberich et al. | Sept. 18, 1956 |